United States Patent
Metz

(10) Patent No.: US 7,420,346 B2
(45) Date of Patent: Sep. 2, 2008

(54) DRIVE ARRANGEMENT FOR A WIPER DEVICE FOR WINDOWS OF MOTOR VEHICLES

(75) Inventor: Ulrich Metz, Achern (DE)

(73) Assignee: Robert Bosch GmbH (DE)

( * ) Notice: Subject to any disclaimer, the term of this patent is extended or adjusted under 35 U.S.C. 154(b) by 316 days.

(21) Appl. No.: 10/540,034

(22) PCT Filed: Jul. 11, 2003

(86) PCT No.: PCT/DE03/02334

§ 371 (c)(1),
(2), (4) Date: Jun. 22, 2005

(87) PCT Pub. No.: WO2004/060731

PCT Pub. Date: Jul. 22, 2004

(65) Prior Publication Data

US 2006/0250100 A1    Nov. 9, 2006

(30) Foreign Application Priority Data

Dec. 23, 2002  (DE) ............... 102 61 926

(51) Int. Cl.
*H02P 5/00* (2006.01)
(52) U.S. Cl. ............ 318/443; 318/282; 318/444; 318/466; 15/250.21
(58) Field of Classification Search ......... 318/282, 318/483, 443, 444, 466; 15/250.16, 250.21, 15/250.3, 250.27, 250.31
See application file for complete search history.

(56) References Cited

U.S. PATENT DOCUMENTS

| | | | | |
|---|---|---|---|---|
| 3,253,206 | A | * | 5/1966 | Romanowski ............ 318/466 |
| 3,355,198 | A | * | 11/1967 | Deibel ................... 403/68 |
| 3,579,067 | A | * | 5/1971 | Riester .................. 318/444 |
| 3,717,048 | A | * | 2/1973 | Carpenter ................ 74/600 |
| 3,831,219 | A | * | 8/1974 | Deutscher et al. ........ 15/250.21 |
| 3,851,351 | A | * | 12/1974 | Pickles et al. .......... 15/250.25 |
| 3,873,449 | A | * | 3/1975 | Connelly et al. .......... 210/359 |
| 4,229,853 | A | * | 10/1980 | Gmeiner et al. ......... 15/250.16 |
| 4,494,421 | A | * | 1/1985 | Matuoka ................. 74/600 |
| 4,543,839 | A | * | 10/1985 | Buchanan et al. .......... 74/98 |
| 4,707,641 | A | * | 11/1987 | Guerard et al. ........... 318/443 |

(Continued)

FOREIGN PATENT DOCUMENTS

DE      199 53 515      5/2001
EP      0 769 436       4/1997

OTHER PUBLICATIONS

"Wischerantrieb Mit Reversiertechnik" ATZ Automobiltechnische Zeitschrift, Franckh'sche Verlagshandlung. Stuttgart, DE, vol. 98, No. 3, Mar. 1, 1996 p. 173 XP000558449, ISSN: 0001-2785, the whole document.

*Primary Examiner*—Paul Ip
(74) *Attorney, Agent, or Firm*—Michael Best & Friedrich LLP

(57) ABSTRACT

The invention relates to a drive arrangement of a wiper device for windows of motor vehicles with at least two swivel-mounted wiper arms (18, 20) that are connected to one another via a crank mechanism, wherein one of the wiper arms (18) is directly coupled with a driven shaft (16) of an electromotive drive (10).

1 Claim, 3 Drawing Sheets

U.S. PATENT DOCUMENTS

| | | | | |
|---|---|---|---|---|
| 4,768,257 A * | 9/1988 | Brusasco | ................... | 15/250.3 |
| 4,993,102 A * | 2/1991 | Honda et al. | ........... | 15/250.202 |
| 5,142,729 A * | 9/1992 | Imamura | ................. | 15/250.16 |
| 5,549,286 A * | 8/1996 | Vacca | ......................... | 267/154 |
| 5,568,026 A * | 10/1996 | Welch | ......................... | 318/443 |
| 5,634,726 A * | 6/1997 | Edele et al. | ................. | 384/276 |
| 5,848,553 A * | 12/1998 | Miyazaki | ...................... | 74/42 |
| 5,855,140 A * | 1/1999 | Imamura | ...................... | 74/42 |
| 6,101,664 A * | 8/2000 | Egner-Walter et al. | ..... | 15/250.3 |
| 6,121,741 A * | 9/2000 | Berger et al. | ................. | 318/483 |
| 6,140,785 A * | 10/2000 | Hogler | ....................... | 318/282 |
| 6,775,878 B2 * | 8/2004 | Heinrich et al. | .......... | 15/250.21 |
| 6,944,906 B2 * | 9/2005 | Moein et al. | ................ | 15/250.3 |
| 7,171,718 B2 * | 2/2007 | Moein et al. | ................ | 15/250.3 |
| 2001/0022475 A1 * | 9/2001 | Uchida et al. | ............. | 310/68 C |
| 2003/0024064 A1 * | 2/2003 | Heinrich et al. | .......... | 15/250.21 |
| 2003/0056314 A1 * | 3/2003 | Heinrich et al. | .......... | 15/250.21 |
| 2003/0213087 A1 * | 11/2003 | Moein et al. | ................ | 15/250.3 |
| 2004/0111819 A1 * | 6/2004 | Zimmer | ................... | 15/250.21 |
| 2004/0244136 A1 * | 12/2004 | Bledsoe et al. | ........... | 15/250.27 |
| 2005/0217699 A1 * | 10/2005 | Murakami et al. | ............. | 134/6 |
| 2006/0005341 A1 * | 1/2006 | Lee | ......................... | 15/250.31 |
| 2006/0021176 A1 * | 2/2006 | Moein et al. | ................ | 15/250.3 |
| 2006/0053577 A1 * | 3/2006 | Moein et al. | ................ | 15/250.3 |
| 2006/0207049 A1 * | 9/2006 | Powell, Jr. | ................ | 15/250.27 |

\* cited by examiner

DRIVE ARRANGEMENT FOR A WIPER DEVICE FOR WINDOWS OF MOTOR VEHICLES

BACKGROUND OF THE INVENTION

The invention relates to a drive arrangement of a wiper device for windows of motor vehicles.

Various designs of drive arrangements for windshield wiper devices of motor vehicles are known. A known arrangement is comprised of the transfer of rotary propulsion of an electric motor into a rotating movement of a wiper arm axis with two end positions. This transmission typically takes place by means of a crank mechanism.

Since most of the time a windshield wiper device is made up of two wiper arms that can be swiveled in a parallel direction, a second wiper arm is coupled with the first by means of a crank and rocker linkage or the like. The kinematics of this coupling can take the various paths of motion of the two wiper arms into consideration since, to increase the wiper field on the window, oftentimes one of the two wiper arms describes a greater slewing angle than the other.

SUMMARY OF THE INVENTION

A drive arrangement of a wiper device for windows of motor vehicles in accordance with the invention includes at least two swivel-mounted wiper arms that are connected to one another via a crank mechanism. With this arrangement, one of the wiper arms is directly coupled with a driven shaft of an electromotive drive. It is preferred that this electromotive drive includes a uniformly transmitting gear. In addition, it is also preferred that an electric driving motor of the electromotive drive feature rotational direction reversal. This rotational direction reversal is responsible for a reversal of the rotational direction of the driving motor at each end of travel of the wiper arms.

As compared with a conventional wiper drive, the drive arrangement in accordance with the invention makes it possible to dispense with one intermediate gear since one of the wiper arms is directly driven, i.e., without a non-uniformly transmitting intermediate gear arranged in-between. The same motor shaft preferably drives the other wiper arm in a conventional manner via a non-uniformly transmitting intermediate gear. A coupling of the two wiper arm shafts can be accomplished in particular by means of a crank and rocker linkage so that the wiper arms describe a path of motion in the same direction, wherein the paths of motion can be parallel to one another depending upon the kinematics.

The electromotive drive preferably features a sensory mechanism to detect the end of travel of the wiper arms. This sensory mechanism can provide for the required reversal of the rotational direction of the driving motor. In addition, this type of sensory mechanism is also suitable for making speed control of the wiper arms possible. Thus, one embodiment of the invention can provide for the speed of the wiper arms to be reduced always in the vicinity of the end of travel so that as a whole a harmonic sequence of motion is made possible.

Additional advantages embodiments of the invention are yielded from the remaining features cited in the dependent claims.

BRIEF DESCRIPTION OF THE DRAWINGS

The invention is explained in more detail in the following in preferred exemplary embodiments on the basis of the associated drawings. They show.

DETAILED DESCRIPTION

Figure 1:
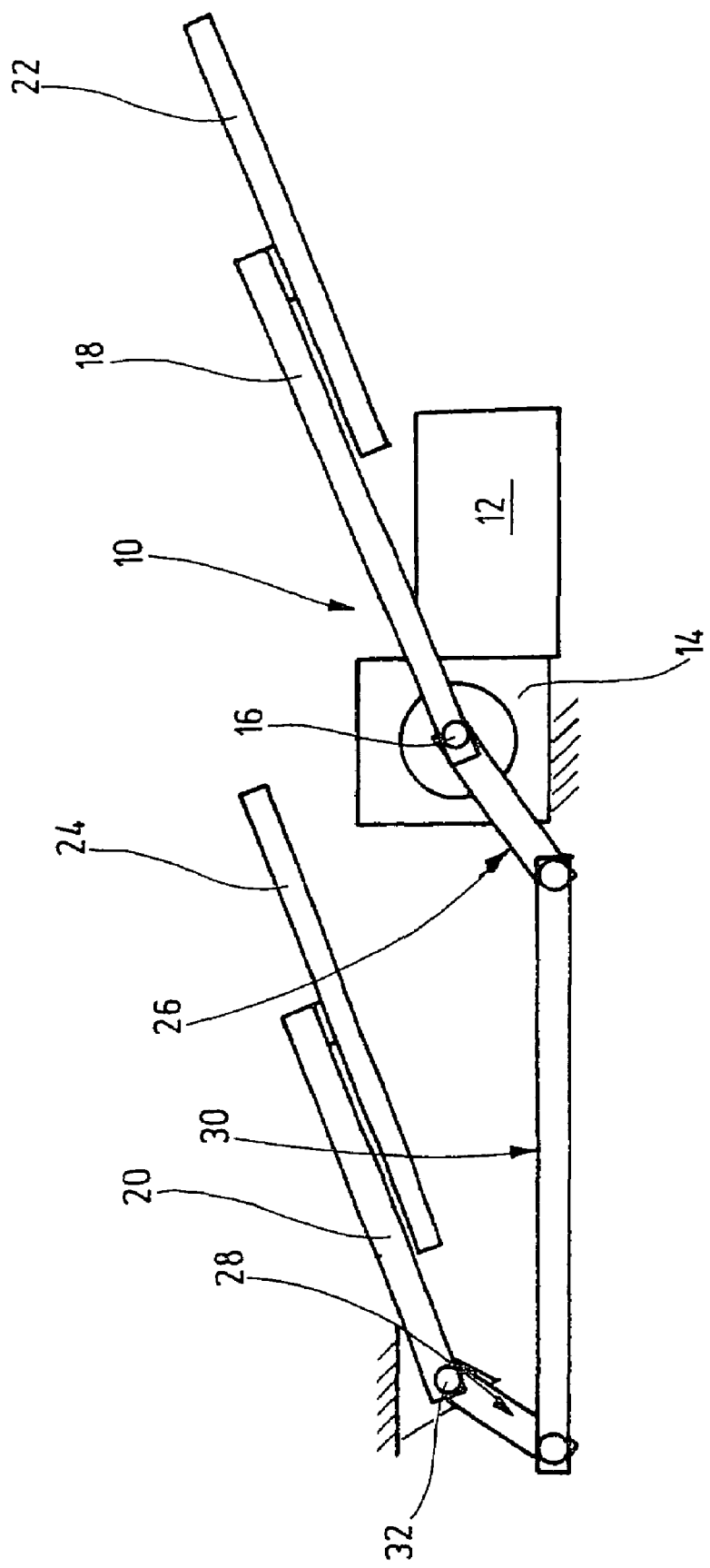
FIG. 1 A depiction of the principle of a drive arrangement for a windshield wiper device in accordance with the invention.
Figure 2:
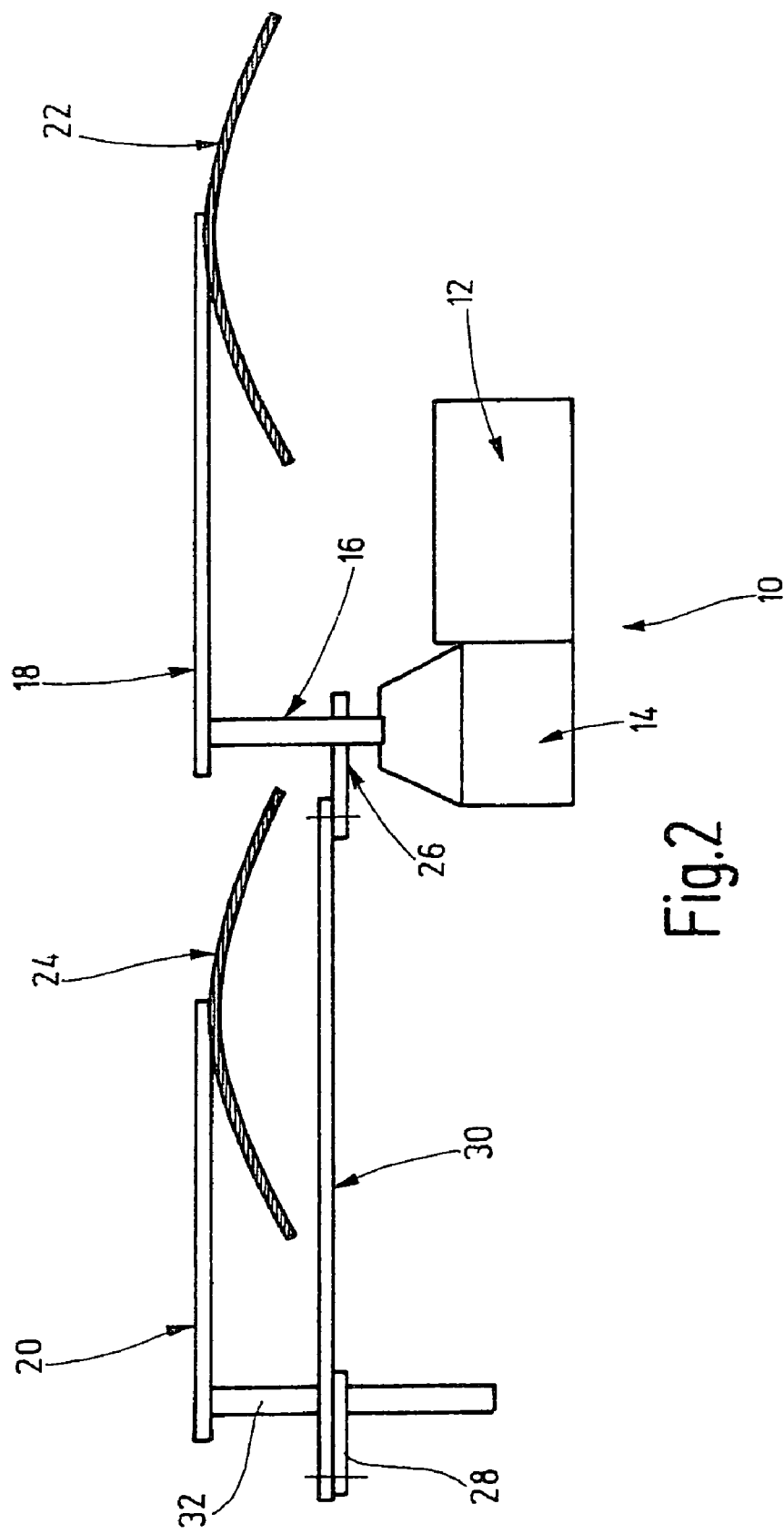
FIG. 2 A schematic top view of the drive arrangement according to FIG. 1.

An exemplary embodiment of a drive arrangement of a wiper device for windows of motor vehicles in accordance with the invention is illustrated on the basis of FIGS. 1 and 2. A first wiper arm 18 is connected to a driven shaft 16 of an electromotive drive 10. This drive 10 includes an electric driving motor 12 and a uniformly transmitting gear 14 coupled with it, whose driven shaft 16 drives the first wiper arm 18. Arranged on an opposite, free end of the first wiper arm is a first wiper blade 22, which travels over the window of the motor vehicle (not shown) in an alternating movement of the wiper arm 18.

The electromotive drive 10 preferably features a sensory mechanism (not shown) to detect the end of travel of the wiper arm 18 and is responsible for a respective rotational direction reversal of the electromotive motor 12 at the end of travel, which reversal is respectively transmitted via the uniformly transmitting gear 14 to the driven shaft 16.

In addition, the sensory mechanism is preferably in a position to slightly retard the speed of the wiper arm 18 in the vicinity of the two ends of travel in order, if necessary, to make possible a uniform sequence of motion that is gentle to the material.

In addition, a crank 26 is coupled with the driven shaft 16, which represents a lever arm for a crank and rocker linkage 30 that is positioned on it in an articulated manner.

Another end of the crank and rocker linkage 30 is connected in an articulated manner with a rocker arm 28, which is coupled with a second shaft 32. The second shaft 32 is aligned approximately parallel to the driven shaft 16 and bears a second wiper arm 20, on whose free end a second wiper blade 24 is arranged. The crank mechanism, which is made up of the crank 26, the crank and rocker linkage 30 and the rocker arm 28, is responsible for transmitting the rotating movements of the driven shaft 16 to the second shaft 32 and therefore to the second wiper arm 20.

Depending upon the desired paths of motion, the crank 26 and the rocker arm 28 can feature lever arms of different lengths so that, for example, the first wiper arm 18 can feature a pivoting angle of 110 degrees and the second wiper arm 20 can feature one of only 95 degrees. It is also possible to set a permanent angle offset of the two wiper arms 18 and 20 via the length of the crank and rocker linkage 30 in relation to the distance of the two shafts 16 and 32.

The drive arrangement in accordance with the invention makes it possible to dispense with a non-uniformly transmitting gear between the driving motor 12 and the driven shaft 16, as is required in the case of conventional wiper drives. The uniformly transmitting gear 14 must merely provide for a speed adjustment and can therefore be considerably more compact than a non-uniformly transmitting gear. Structural space can be saved depending upon the available space conditions in the vehicle.

With the electronics that are available today, an electronic reversal of the rotational direction can be obtained in a very simple and reliable manner. This type of electronic control of the rotating movements is clearly more cost effective than using mechanical parts like a non-uniformly transmitting gear.

Figure 3:
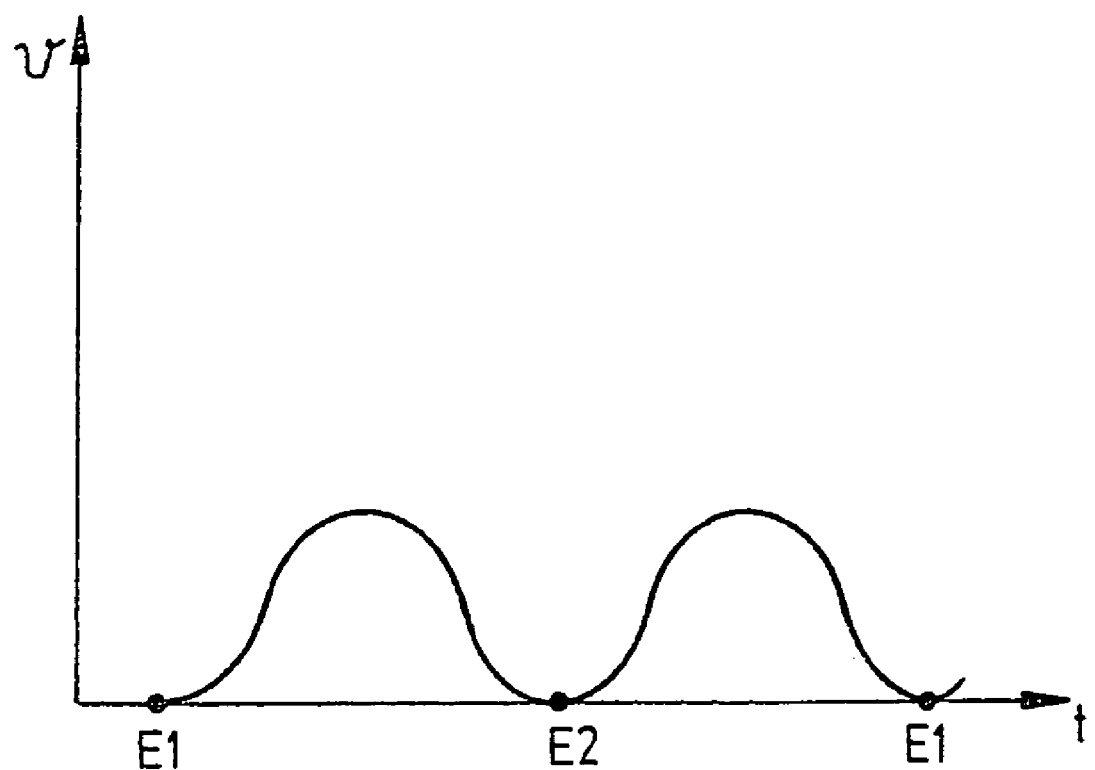
FIG. 3 An example of a speed progression of a wiper arm of the drive arrangement in accordance with the invention.

FIG. 3 illustrates a qualitative speed diagram of one of the two wiper arms 18 or 20, which is slowed at each of its two ends of travel E1 and E2 in order to enable the most uniform possible rotating movement of the wiper arms that is gentle to the material. In this case, the x-axis shows time t and the y-axis shows the rotating speed v of one of the two shafts 16 or 32, each in a qualitative representation. One reversal of the rotational direction (not shown) is provided for when passing through each of the ends of travel E1 and E2.

The invention claimed is:

1. Drive arrangement of a wiper device for windows of motor vehicles with at least two swivel-mounted wiper arms (18, 20) that are connected to one another via a crank mechanism, wherein one of the wiper arms (18) is directly coupled with a driven shaft (16) of an electromotive drive (10), characterized in that the electromotive drive (10) includes a uniformly transmitting gear (14) coupled to a driving motor (12), and wherein the uniformly transmitting gear (14) includes the driven shaft (16), characterized in that an electric driving motor (12) of the drive (10) features rotational direction reversal, characterized in that a reversal of the rotational direction of the electromotive drive (10) is provided for at each end of travel of the wiper arms (18, 20), characterized in that the electromotive drive (10) features a sensory mechanism to detect the end of travel, characterized in that the electromotive drive (10) features a speed control, characterized in that the speed control always provides for a reduction in the rotational speed of the drive (10) near the ends of travel of the wiper arms (18, 20), characterized in that at least two wiper arms (18, 20) are coupled via a crank and rocker linkage (30), characterized in that both of the wiper arms (18, 20) feature a path of motion in the same direction, characterized in that at least two wiper arms (18, 20) feature an approximately parallel path of motion.

* * * * *